Figure 1:
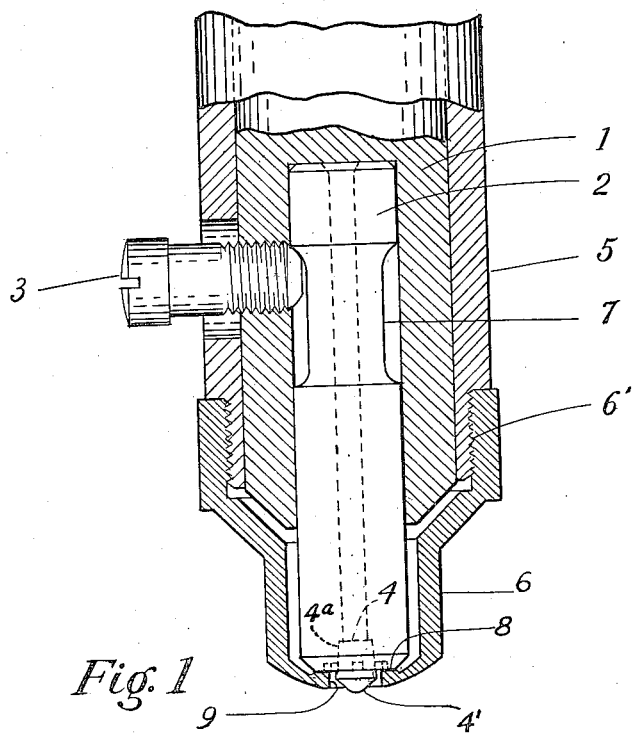

Feb. 11, 1936.   A. F. SHORE   2,030,475
PENETRATOR STEM FOR HARDNESS INDICATING APPARATUS
Filed Oct. 26, 1927

Albert F. Shore
INVENTOR.

BY  Gaa Hoffman
ATTORNEYS.

Patented Feb. 11, 1936

2,030,475

UNITED STATES PATENT OFFICE 2,030,475

PENETRATOR-STEM FOR HARDNESS-INDICATING APPARATUS

Albert F. Shore, New York, N. Y.

Application October 26, 1927, Serial No. 228,749

12 Claims. (Cl. 265—12)

My invention relates to apparatus for testing the hardness of materials of the character disclosed by Letters Patent No. 1,770,046, issued July 8, 1930, the application for which patent was copending with the present application, wherein the material is impressed or indented by an indentor and the hardness thereof determined by the depth of penetration and the pressure required to make the indentation, a micrometer indicator being provided to measure the depth of penetration, as well as means, as a gauge, to measure the pressure required to make the indentation, and utilizing a constant depth of penetration and variable load or pressure to effect the penetration.

In the machine of said Letters Patent no means is provided for limiting the depth or undue penetration of the material under test by the penetrator point, which undue penetration would endanger the penetrator point as superhard and necessarily brittle penetrating points are required to be used for this purpose, and no means is provided for offsetting and controlling variation or contraction of the penetrator.

It is the object of the present invention to provide means to limit the depth of and prevent undue penetration of the material under test by the penetrator point and protect the penetrator point against excessive and destructive pressure, and to provide means to offset variation, such as distortion or contraction in the penetrator.

In machines of said Letters Patent the indentor or penetrator, comprising a jewel, such as a diamond, or hardened steel, is carried by a bar which receives and transmits the force of the pressure to the indentor, said bar carrying a micrometer depth measuring and indicating gauge which is operated by an actuator carried by a sleeve slidably mounted on the indentor carrying bar and carrying a perforated cap for the passage of the indentor and adapted to contact with and clamp the specimen under test to a support therefor, the material penetrating movement of the bar relative to the sleeve effecting actuation of the micrometer gauge. Owing to the delicacy of making indentations by this method, especially in very hard metals, it is necessary to make the contactor cap somewhat heavier than is desirable, and to provide a contactor cap of proper size and lightness certain elements must be incorporated to protect the indentor against excessive and destructive pressure.

It is a further object of the invention to provide means for limiting the depth of penetration of the metal under test by the indentor by constructing and arranging the pressure applying means and contactor cap whereby upon a predetermined movement of the indentor carrying bar relative to the contactor cap carrying sleeve the bar and sleeve will function as a rigid unit or column, the contactor cap permitting only limited movement of the indentor and after such movement has been imparted to the indentor the pressure applied to the bar will be transmitted to and taken up by the cap.

In carrying out the invention a stem to participate in the movements of the pressure applying bar is mounted in a socket in the end of said bar with an end portion of the stem extending from the end of the bar, a penetrator comprising a frustoconical body having a hemi-spherical indentor point at the end of larger diameter is mounted in a recess in the end of the stem corresponding in shape to the body of the penetrator and having a depth whereby the hemi-spherical indentor point will extend beyond the end of the stem. To limit the movement and prevent undue penetration of the material under test by the indentor point and protect the indentor point against excessive and destructive pressure, a cap is connected to a sleeve slidably carried on the pressure applying bar. The cap is adapted to engage the material under test and is arranged with an annular shoulder about the opening for the engagement of the penetrator stem and thus limit the outward movement of the penetrator and the depth of penetration by the indentor point. In machines of this character a micrometer gauge is carried by the pressure applying bar and is actuated by an actuator carried by the cap carrying sleeve by the movement of the gauge with the bar relative to the sleeve. To offset variations in the hardness of different penetrators and consequent variable distortion or contraction thereof, the penetrator stem is provided with a weakened portion intermediate the ends that is calibrated proportionally with the hardness and contractibility of the indentor point so that variations in hardness and contraction in different indentors is compensated for and the contractibility of different indentor units will be constant with the result that there will be a movement of the pressure applying bar relative to the sleeve corresponding to the penetration of the indentor into the material under test and actuation of the depth indicating gauge to indicate the correct depth of penetration.

Figure 2:
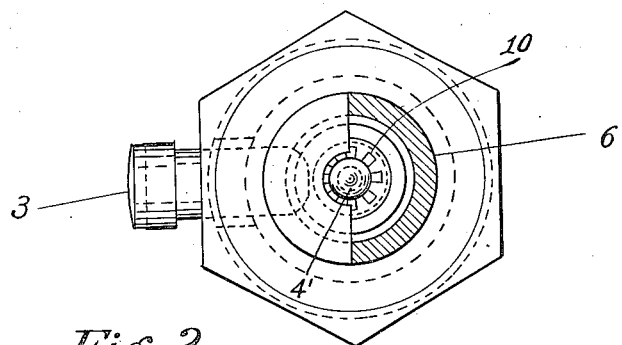

In the drawing accompanying and forming a part of this application, Figure 1 is an elevation, partly in section, of the end portion of a pressure applying bar of apparatus for testing the hardness of materials, and showing the preferred embodiment of my invention; and Figure 2 is a view looking at the bottom of Figure 1, partly in section, to show the mounting of the indentor in its carrying stem.

In the embodiment illustrated only so much of a machine for testing the hardness of material is shown as is essential to an understanding of the invention, and comprising the lower portion of a pressure applying bar 1, said bar having a socket in one end in which a penetrator carrying stem 2 is mounted and releasably retained therein by a set screw 3 threaded into and extended through the wall of the bar socket to engage a shoulder formed by a reduced and weakened portion 7 of the penetrator, the stem being of a length to extend beyond the end of the bar. The penetrator or indentor embodying a body portion 4a of frustoconical form having an indentor tip or point 4' of hemi-spherical form at the end of larger diameter is mounted in a socket or recess 4 in the end of the penetrator stem 2 corresponding in form to the body of the indentor, said socket constituting an enlargement of a bore through the stem, indicated in dotted lines, and is of a depth less than the length of the body 4a of the indentor so that a part thereof arranged with the hemi-spherical indentor point projects beyond the end of the stem, a part or the whole of the spherical surface of the indentor point being adapted to penetrate the surface of the material when pressure is applied to the penetrator through the pressure bar and penetrator stem in making a hardness test.

To limit and prevent undue penetration of the material under test by the indentor point and the possible crushing and destroying of the indentor point a cap 6 having an opening in the end is engaged over the end of the penetrator stem, the opening in the cap being of a diameter somewhat greater than the end of the penetrator arranged with the indentor point and of less diameter than the penetrator carrying stem 2, the cap being provided with an inwardly extending annular flange or shoulder for engagement by the end of the penetrator stem, said stem being tapered toward the end to provide a reduced shoulder for engagement with said flange, as at 8. The cap has a screw threaded connection 6' with a sleeve 5 slidable on the bar 1 whereby the bar is adapted to have movement relative to the cap to project the end of the penetrator with the hemi-spherical indentor point a distance beyond the cap equal to the greatest depth of indentation to be made in the material under test.

To provide reduced and yieldingly contacting surfaces between the penetrator stem and indentor and thus prevent cleavage and stripping off of the indentor tip, which it has a tendency to do as the penetrator is forced to its seat in the penetrator 7 should the contacting surface of the penetrator stem with the penetrator be continuous and non-yielding, a series of serrations 10 are equidistantly spaced and circumferentially disposed about the outer portion of the wall of the penetrator engaging socket 4 in the penetrator stem.

In the operation of testing the hardness of materials the pressure applying bar 1 and cap carrying sleeve are actuated to bring the cap 6 into contact with the surface of the specimen (not shown) to be tested. Should the sleeve be supported by the machine so that the reduced end of the penetrator stem 2 rests and is supported upon the shoulder or annular flange 8 of the cap 6, which is preferable although not absolutely essential, as the indentor is brought into contact with the test specimen the indentor bar assembly with the penetrator carrying stem will be moved upward relative to the contactor cap 6 with the penetrator carrying stem out of engagement with the cap flange 8. In this position of the parts pressure is applied to the pressure bar 1 causing the indentor tip 4' to indent or enter into the test specimen until the penetrator stem 2 contacts with the flange 8 of the contactor cap 6, which will arrest and limit the further indenting of the test specimen by the indentor tip, the pressure applied to the pressure bar in excess of that required to make such indentation being taken up by the contactor cap 6 by the penetrator stem engaging with the cap flange 8, the cap and sleeve forming with the pressure bar a rigid column intervening between the pressure applying means and test specimen.

To measure and indicate the depth of penetration a micrometer gauge (not shown) is mounted upon the pressure bar 1 to participate in the movement thereof, and an actuator (not shown) for the gauge is carried by the sleeve 5 slidably mounted on the pressure bar, the actuator being operative to actuate the gauge by the movement of the bar relative to the sleeve in transmitting material penetrating movement to the penetrator, the extent of actuation of the gauge being in accordance with the extent of the movement of the pressure bar relative to the sleeve and depth of the indentation made in the material under test.

The material of the penetrator is of such nature that it will elastically yield and contract under the force of the pressure applied thereto in effecting indentation of the material under test, the degree of contraction depending upon the character of the material from which the indentor is made, usually of a diamond and the hardness of the material under test. This contraction of the indentor will effect the movement of the depth measuring gauge by the pressure bar relative to its actuator carried by the sleeve 5 with the result that the gauge will be actuated not only in accordance with the depth of penetration of the indentor into the material under test, but also by the movement of the pressure bar equal to the contraction of the indentor and there will thus be an inaccurate actuation of the actuator gauge and indication as to the depth of the indentation.

The penetrator, particularly when consisting of a jewel, such as a diamond, has variable rigidity which cannot be controlled, some having greater rigidity than others with the result that some are more contractile than others. To compensate for variations in the rigidity of different indentors, there is, therefore, provided the penetrator stem of metal, the rigidity of which may be readily controlled and the contraction thereof predetermined in accordance with pressure applied thereto. For this purpose the stem is provided with the weakened portion 7 produced by reducing the diameter of a portion of the stem adjacent one end, said reduced portion being of such extent and nature as to permit of an elastic contraction or shortening of the penetrator stem 7 proportional with the hardness and contractibility of the penetrator effected by the penetrating force or pressure applied thereto and the resistance offered to the penetrator by the material under test to the penetration thereof by the penetrator, whereby to cause the contractibility of each stem and indentor carried thereby to be equal to the total contractibility of a standard penetrator stem and indentor under the same load conditions and adapting the interchanging of one penetrator for another penetrator in hardness testing apparatus. Furthermore, by making the body 4a of the indentor of frustoconical form, and the socket in the penetrator stem in which said body is engaged of the same form, there is assured a rigid connection between the stem and indentor, and a confining of the indentor and thus materially reducing the tendency of the indentor being distorted and contracted.

It is understood that the invention is not limited to the construction and arrangement of parts illustrated and described and that modifications may be made in the construction and arrangement of the various parts without departing from the spirit and scope of the invention.

I claim:

1. In means for measuring the hardness of material, a pressure bar, a sleeve slidable on and movable with the pressure bar, a cap carried by said sleeve having an axial opening in the end wall and an inwardly extending flange disposed about the opening, a stem carried by the pressure bar within the sleeve cap adapted to contact the cap flange, and a penetrator carried by said stem adapted to extend through the cap opening.

2. In means for measuring the hardness of material, a pressure bar, a sleeve slidable on and movable with the pressure bar, a cap having screw threaded connection with the sleeve and an opening through the end wall arranged with an inwardly extending shoulder, a stem carried by the pressure bar, said stem having a reduced portion intermediate the ends and a reduced end for contacting with the cap shoulder, and a penetrator removably carried by the stem adapted to extend a limited distance through the cap opening when the stem engages the cap shoulder.

3. In means for measuring the hardness of material, a pressure bar having a socket in the end, a sleeve slidably mounted on the pressure bar and having external screw threads at one end, a cap having internal screw threads at the open end thereof for releasable connection with the threaded end of the sleeve, said cap having an opening in the end wall surrounded by an inwardly extending flange, a stem engaged in the pressure bar socket, said stem having an annular reduced portion adjacent one end and its other end reduced to contact with the inwardly extending cap flange, an a removable penetrator point carried by the stem adapted to extend a limited distance through the opening in the cap.

4. In means for measuring the hardness of material, a pressure bar having a socket in the end, a sleeve slidable on the pressure bar, a contactor cap having screw threaded connection at the open end with the sleeve and an opening in the end wall with an inwardly extending flange disposed about said opening, a stem engaged in the socket in the end of the pressure bar with one end in contact with the inwardly extending cap flange, said stem having a weakened portion intermediate the ends and a socket in the end in contact with the cap flange arranged with a series of teeth circumferentially disposed about the socket wall, and an indentor in the stem socket of a length to extend from the stem and to a limited extent through the opening in the end wall of the cap, the weakened portion of the stem being calibrated to render the stem longitudinally contractile proportional to the contractibility of the indentor.

5. In means for measuring the hardness of material, a pressure bar having a socket in one end, a stem carried in the bar socket and of a length to project beyond the end of the bar, said stem having an annularly reduced portion adjacent one end and reduced at the opposite end, and said last mentioned end having a socket therein the wall of which tapers inwardly and radial serrations disposed about the entrance to the socket, a screw threaded into an opening in the socket wall of the pressure bar and adapted to engage the reduced portion of the stem to releasably retain the stem in the bar socket, an indentor mounted in the stem socket and having a hemi-spherical tip and a body having a conical side wall merging with the surface of the hemi-spherical tip, the wall of the body tapering at the same angle as the wall of the stem socket and contacting with the serrated wall portion of the stem socket, a sleeve slidably mounted on the pressure bar, and a contactor cap carried by the sleeve having an opening in the end wall for the passage of the indentor and an annular shoulder about the opening within the cap for engagement with the reduced end of the stem.

6. In means for measuring the hardness of material, a pressure bar having a socket in one end, a stem mounted in and projecting from the bar socket, an indentor member carried at the outer end of the stem, a sleeve slidably carried by the pressure bar, a cap carried by the sleeve to engage over the end of the bar and stem and having an opening in the end wall for the passage of the indentor member and adapted for the engagement of the stem about the marginal portion of the wall of the opening.

7. Means as claimed in claim 6, wherein the projecting end of the stem is reduced in diameter and has a bore therethrough with an enlargement at the end of reduced diameter arranged with inwardly extending radial serrations providing a yielding contact wall for the engagement of the indentor member, and the cap arranged with an annular shoulder about the opening in the end wall and within the cap for engagement of the reduced end of the stem.

8. In means for measuring the hardness of material, a stem having a socket of truncated conical form in one end, and an indentor carried in the stem socket having a frusto-conical body conforming to the socket in the stem and a hemispherical tip at the end of larger diameter, and said stem having a reduced portion to weaken the stem sufficiently to cause the contractibility of the stem and indentor carried thereby to be equal to the total contractibility of a standard stem and indentor under the same load conditions.

9. A penetrator for hardness measuring means, comprising a stem having a truncated conical socket in one end, and an indentor carried in the stem socket having a frusto-conical body conforming to the stem socket and having a hemispherical tip at the end of larger diameter, said indentor having greater rigidity than the stem and the stem having a reduced portion to weaken the stem sufficiently to cause the contractibility of the stem and indentor carried thereby to be equal to the total contractibility of a standard stem and indentor under the same load conditions.

10. In means for measuring the hardness of material, a pressure bar having a socket in the end, an indentor, and a stem carrying said indentor mounted in the bar socket, said stem having a reduced portion to render the stem contractile proportional to the contractibility of the indentor to cause the contractibility of the stem and indentor carried thereby to be equal to the total contractibility of a standard stem and indentor under the same load conditions.

11. In means for measuring the hardness of material, a pressure bar having a socket in the end, an indentor, a stem carrying said indentor at one end mounted in the bar socket, said stem having the end at which it carries the indentor reduced in diameter and an annular reduced portion adjacent the opposite end to render the stem contractile proportional to the contractibility of the indentor to cause the contractibility of the stem and indentor carried thereby to be equal to the total contractibility of a standard stem and indentor under the same load conditions, and a set screw threaded into and extended through the wall of the bar socket to engage the end wall of the reduced portion of the penetrator stem to releasably retain the stem in the bar socket.

12. In a penetrator unit for instruments for measuring the hardness of material, an indentor comprising a body provided with a penetrating tip, and a stem arranged for the mounting and holding of the indentor in one end of and in axial alinement with the stem, and said stem calibrated to cause the stem and indentor to have a total contractibility equal to the contractibility of a standard penetrator unit and adapt the penetrator unit to be interchangeable with other penetrator units in instruments for measuring the hardness of materials.

ALBERT F. SHORE.